(12) United States Patent
Young et al.

(10) Patent No.: US 6,231,294 B1
(45) Date of Patent: May 15, 2001

(54) INDEPENDENT WHEEL-LIFT HAVING A CHASSIS MOUNTED PIVOT POINT

(75) Inventors: Charles E. Young, Falling Waters, WV (US); Harry Carbaugh, Hagerstown, MD (US)

(73) Assignee: Jeer-Dan Corporation, Greencastle, PA (US)

( * ) Notice: Subject to any disclaimer, the term of this patent is extended or adjusted under 35 U.S.C. 154(b) by 0 days.

(21) Appl. No.: 09/266,742

(22) Filed: Mar. 12, 1999

Related U.S. Application Data

(60) Provisional application No. 60/081,937, filed on Apr. 16, 1998, and provisional application No. 60/077,943, filed on Mar. 13, 1998.

(51) Int. Cl.⁷ ....................................................... B60P 3/12
(52) U.S. Cl. ........................................... 414/563; 414/480
(58) Field of Search ................................ 414/477, 478, 414/480, 494, 563

(56) References Cited

U.S. PATENT DOCUMENTS

| | | |
|---|---|---|
| 4,239,275 | 12/1980 | Horneys et al. . |
| 4,318,657 | 3/1982 | Znidaric . |
| 4,750,856 | 6/1988 | Lapiolahti . |
| 4,795,303 | 1/1989 | Bubik . |
| 5,061,147 | 10/1991 | Nespor . |
| 5,249,909 | 10/1993 | Roberts et al. . |
| 5,271,705 | 12/1993 | Pijanowski . |
| 5,951,235 | * 9/1999 | Young et al. ................... 414/480 X |
| 5,984,614 | * 11/1999 | Weber .............................. 414/563 X |

FOREIGN PATENT DOCUMENTS 4 113 748   10/1992  (DE) .

* cited by examiner

Primary Examiner—James W. Keenan
(74) Attorney, Agent, or Firm—McDermott, Will & Emery

(57) ABSTRACT

A combination tilting bed carrier and attached wheel-lift apparatus mounted on a chassis of a towing vehicle. The bed carrier includes a first pivot connected to the chassis and a first motive element extending between the chassis and the bed carrier for actuating tilting of the bed carrier about the first pivot. A wheel-lift is positioned below the bed carrier and includes a second pivot for pivotally connecting the wheel-lift to the chassis, with the first pivot and the second pivot concentrically, or substantially concentrically, aligned with each other. A second motive element extends between the wheel-lift and the bed carrier for actuating tilting of the wheel-lift about the second pivot. The second pivot may include a third motive element which may adjust the second pivot point, and which in conjunction with the second motive element, allows the wheel-lift to conform with either a positive or negative ground surface. The second motive element has a control element to maintain the wheel-lift in a predetermined position in the event of a failure of a second motive element. A third pivot is positioned on the chassis for pivotally connecting a stabilizer strut arm between the wheel-lift and the bed carrier.

17 Claims, 7 Drawing Sheets

INDEPENDENT WHEEL-LIFT HAVING A CHASSIS MOUNTED PIVOT POINT

This application is based upon Provisional Patent Application Serial No. 60/077,943, filed on Mar. 13, 1998, and upon Provisional Patent Application Serial No. 60/081,937, filed on Apr. 16, 1998.

BACKGROUND OF THE INVENTION

The present invention relates to a combination tilting bed carrier and attached wheel-lift apparatus mounted on a chassis of a towing vehicle.

Transporting and towing vehicles such as damaged automobiles and the like, show cars, antique vehicles of various types and other similar types of vehicles has become quite popular in recent years and the development of transport trucks to convey such vehicles has been undertaken.

Transport vehicles having rollback decks are well known as a means for transporting vehicles. One type of transport vehicle having a rollback deck includes a vehicle support surface or the rollback deck movably mounted on a truck bed frame. Specifically, the vehicle support surface is pivotable relative to the truck bed frame between a transport position and a loading position. In the transport position, the support surface is parallel to the bed frame. In the loading position, the support surface is at an angle relative to the bed frame such that it contacts the ground so as allow a disabled vehicle to be rolled thereon.

Another method of towing and transporting vehicles is the wheel-lift apparatus. Typical wheel-lift apparatuses carry disabled vehicles by lifting either the front or rear wheels off the ground, and towing the partially-lifted disabled vehicle on its remaining two wheels. Early versions of the lifting or towing vehicles have a wheel-lift apparatus in which the boom and related lifting mechanism are located beneath the deck of the lifting and towing vehicle. Typically, the wheel-lift apparatus boom has an inner end pivotally mounted adjacent the rear axle and a wheel supporting cradle at an outer end. U.S. Pat. No. 5,061,147, issued to "Nespor" on Oct. 29, 1993, (Reexamination Certificate No. B1 5,061,147, issued on Feb. 25, 1997), entitled "Vehicle Carrier with Wheel-lift", describes a wheel-lift apparatus boom having an inner end pivotally mounted to struts and a bracket adjacent the rear axle and a wheel supporting cradle at an outer end. The boom described in the patent to Nespor is outwardly extended by hydraulic cylinders at an angle raised substantially from horizontal to the ground. Such devices suffer from a number of deficiencies, as explained below.

For example, by utilizing a boom raised at a substantial slope to connect the wheel-supporting cradle to the lifting or towing vehicle, there is a possibility of the supporting cradle or the boom hitting the disabled vehicle, often resulting in significant damage to the disabled vehicle. In some types of vehicles, such as vans and Jeeps, the danger is minimal since there is a very short distance between the bumper and the adjacent wheel axle. However, on vehicles where there is substantial overhang of the body or chassis, beyond the rear and/or front axle the likelihood of damage to the disabled vehicle by the lifting wheel-lift apparatus is significant. A 1996 "CHEVROLET CAMARRO" is an example of a car that is likely to be damaged by many known wheel-lift apparatuses.

U.S. Pat. No. 5,951,235 by C. Young et al. entitled "Advanced Rollback Wheel-Lift" filed Apr. 8, 1997, describes an independent wheel-lift ("IRL") suitable to tow a vehicle behind a car carrier, wrecker or like vehicle. The wrecker includes a bed suitable to support a first vehicle is mounted upon a bed carrier which is pivoted on a first pivot point on the chassis. A first pair of hydraulic cylinders is used to tilt the bed carrier to a ground engaging position to receive a vehicle. An IRL (or wheel-lift or underlift) is mounted to the bed carrier at a second pivot point near the rear wheels of the wrecker, and can thereby be used to tow a second vehicle. The IRL includes a telescopic boom with a second pair of hydraulic cylinders mounted between the boom at the rear end of the wrecker on the bed carrier. The second hydraulic cylinders are positioned to tilt the IRL in an arc about the second pivot point to enable the IRL to approach a ground engaging position. The rear end of the IRL includes a crossbeam, which includes wheel cradles suitable to engage the front wheels of the second vehicle. Once the vehicle wheels are supported by the crossbeam and wheel cradle, the second hydraulic cylinders are retracted to lift one end of the vehicle.

However the device described in U.S. Pat. No. 5,951,235 includes a wheel-lift pivotally mounted on the bed carrier. By mounting the wheel-lift to the bed carrier rather than to the chassis, the amount of weight and stress placed on the bed carrier by the wheel-lift can damage the bed carrier and first pair of hydraulic cylinders over repeated load cycles. If the wheel-lift is mounted to the chassis at the same or a proximate location to the first pivot point of the bed carrier then the weight will be distributed between the chassis and the bed carrier thereby extending the useful life of the bed carrier and the first pair of hydraulic cylinders.

In Horneys et al., U.S. Pat. No. 4,239,275, entitled "Vehicle Transporter," the second pivot point is mounted on the chassis. However, the second hydraulic element between the boom and the bed carrier used a movable bearing rather than a fixed mounting as described in the Nespor patent. A disadvantage of the invention described in the Horneys et al. patent is that as the bed carrier rotated, the second hydraulic elements had to absorb the rotational displacement between the bed carrier rotation about the first pivot point. These rotational induced changes over time can cause wear on the second pivot point and the second hydraulic element, and other related linkage and alignment problems.

In Bubik, U.S. Pat. No. 4,795,303, entitled "Vehicle Transporting Apparatus," the second pivot point is mounted on the chassis. However, the second pivot point is located at a position distant from the first pivot point of the bed carrier. This arrangement places added weight and stress on the first hydraulic element.

The inventions described above also fail to include an effective means for locking the wheel-lift to the bed carrier in the event the second motive means fails. For example in the patent to Nespor, entitled "Vehicle Carrier With Wheel-lift," failure of either of second hydraulic cylinders in the absence of a locking device to secure the boom to the bed carrier in a lifted position could cause a traverse rotation of the boom and accidental displacement of the second vehicle from the wheel cradle. Other inventions use a pin that is placed in one of a series of matching holes on a portion of the bed carrier and the wheel-lift to fix the position of the wheel-lift. However, this arrangement is difficult to use in that it is difficult to align the holes when the wheel-lift is loaded with a vehicle.

None of the patents described above provides the important advantages associated with towing vehicles comprising a boom capable of a substantial reach while maintaining a horizontally aligned or "low angle" approach and lift during loading and carrying. Additionally, a need exists for a tilting bed carrier and wheel-lifting apparatus mounted to the chassis of a car carrying vehicle at a position that will extend the useful life of the bed carrier and a first motive means. Furthermore, the device should be safe and easy to use. The device should also be constructed in a form, preferably in a kit, which will allow users to retrofit old transport vehicles having rollback decks or other similar car carriers.

SUMMARY OF THE INVENTION

According to this invention, wheel-lift apparatuses are mounted on various types of lifting or towing vehicles (recovery vehicles), such as rollback or tow trucks. The wheel-lift apparatus is provided with means for carrying a disabled vehicle by elevating or lifting and supporting one end of the disabled vehicle while the opposite end of the disabled vehicle is supported by its own wheels rotating along the ground.

As pointed out in greater detail below, one important advantage of the present invention is that the wheel-lift apparatus incorporates a tilting bed carrier and wheel-lifting apparatus mounted to the chassis of a car carrying vehicle at a position that will extend the useful life of the bed carrier and the first motive means. Additionally, the present invention provides a horizontal approach boom capable of a "low angle" approach. The present invention is also safe and easy to use, which prevents injury to an operator of the device, and to the public in general. Furthermore, the present invention is constructed in such a manner that it lends itself to being used to retrofit older transport vehicles having rollback decks or other similar car carriers.

According to the invention, the wheel-lift apparatus comprises extendible booms, a wheel supporting cradle, and motive elements such as hydraulically activated cylinders for raising and lowering the booms and the wheel supporting cradle located below the deck of the lifting, towing, or transport vehicle (recovery vehicle). The present invention is a combination tilting bed carrier and attached wheel-lift apparatus mounted on a chassis of a towing vehicle. The bed carrier includes a first pivot connected to the chassis and a first motive element extending between the chassis and the bed carrier for actuating tilting of the bed carrier about the first pivot.

A wheel-lift is positioned below the bed carrier and includes a second pivot for pivotally connecting the wheel-lift to the chassis, with the first pivot and the second pivot concentrically, or substantially concentrically, aligned with each other. A second motive element extends between the wheel-lift and the bed carrier for actuating tilting of the wheel-lift about the second pivot. The second pivot may include a third motive element which may adjust the second pivot point, and which in conjunction with the second motive element, allows the wheel-lift to conform with either a positive or negative ground surface. The second motive element has a control element to maintain the wheel-lift in a predetermined position in the event of a failure of a second motive element. A third pivot is positioned on the chassis for pivotally connecting a stabilizer strut arm between the wheel-lift and the bed carrier.

As can be seen from above, the present invention provides numerous other advantages. The mounting of a tilting bed carrier and wheel-lifting apparatus to the chassis of a car carrying vehicle will extend the useful life of the bed carrier and the first motive means.

Another advantage of the present invention is to provide a transport or tow truck having a wheel-lift apparatus which is relatively easy to engage with, load, and carry a disabled vehicle and that provides for such engagement without undue maneuvering of the truck.

Still another advantage of the present invention is the provision of a transport truck or tow-truck (recovery vehicle) having a wheel-lift apparatus which will be able to load and carry a disabled vehicle without the substantial danger of tipping of the transport truck and subjecting the disabled vehicle to additional damage.

Further advantages include the provision of a horizontal, "low angle", wheel-lift apparatus enabling superior clearance under disabled vehicles that are low to the ground.

A further advantage includes a device that is constructed in such a manner that it lends itself to being used to retrofit older transport vehicles having rollback decks or other similar car carriers.

The invention itself, together with further objects and advantages, will best be understood by reference to the following detailed description taken in conjunction with the accompanying drawings.

BRIEF DESCRIPTION OF THE DRAWINGS

FIGS. 1 though 7 are presented by way of illustration and not limitation to depict the preferred embodiments of the present invention. Embodiments including the various aspects of the present invention will now be described in detail with reference to the accompanying drawings.

DETAILED DESCRIPTION OF THE INVENTION

Figure 1:
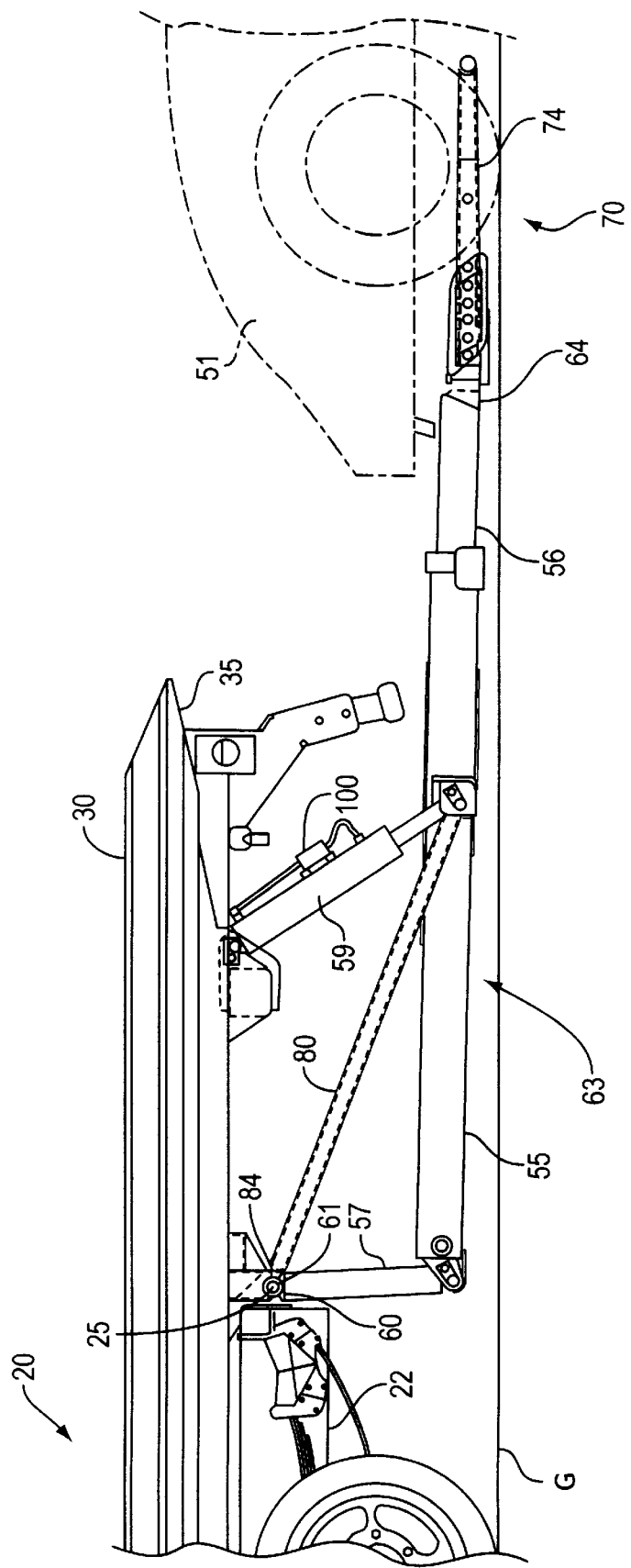
FIG. 1 is a side view of an embodiment of the wheel-lift apparatus attached below the rollback truck subframe, wherein the wheel-lift is in a nearly horizontal position.
Figure 2:
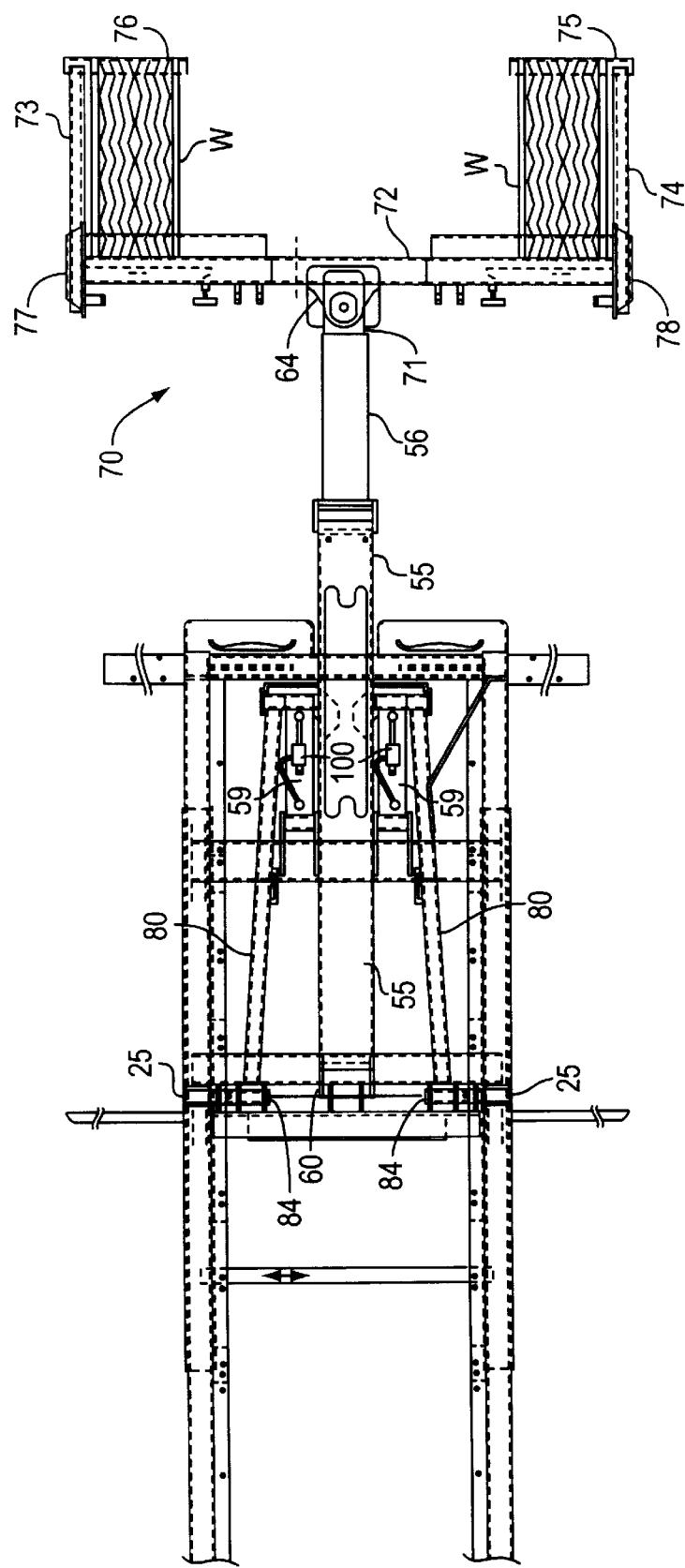
FIG. 2 is a top plan view of an embodiment of the wheel-lift apparatus of the present invention including the wheel-supporting cradle.
Figure 3:
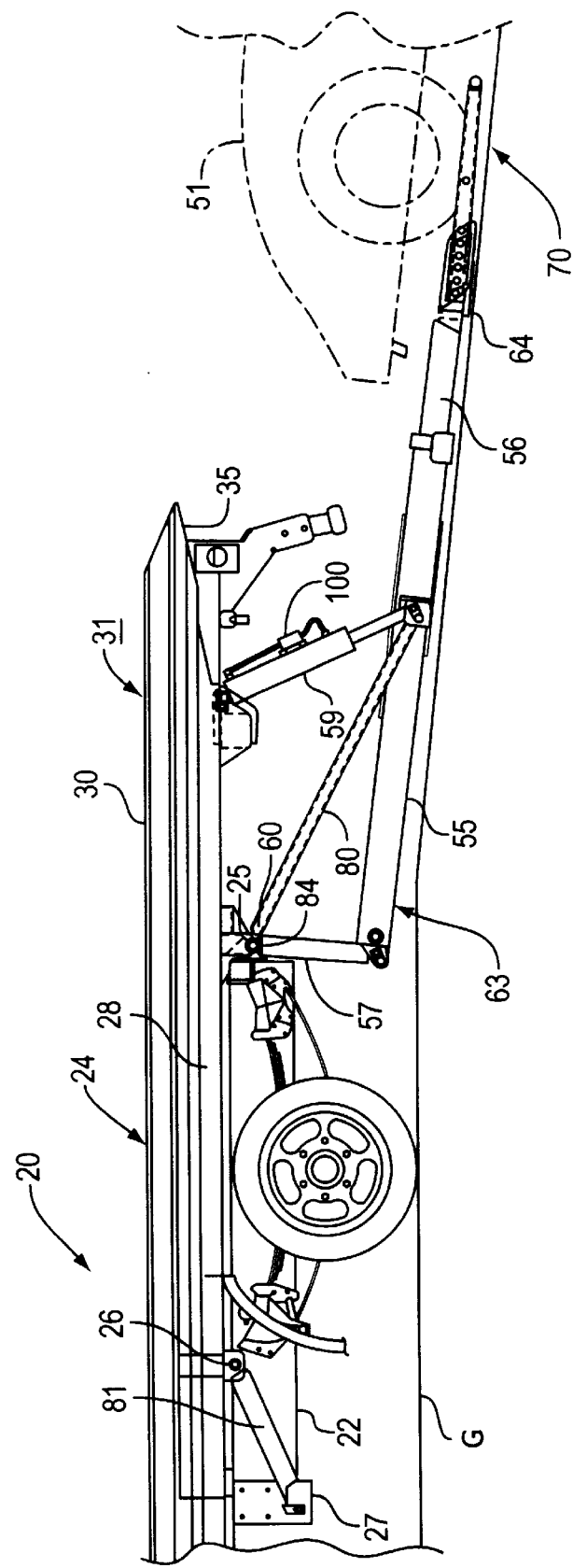
FIG. 3 is a side view of an embodiment of the wheel-lift apparatus attached below the rollback truck subframe, wherein the wheel-lift is in a loading position such that it is aligned at an angle below horizontal and adjacent with ground surface having a negative incline.

Turning now to the drawings, wherein like or corresponding reference numerals are used for like or corresponding parts throughout the figures, as depicted in FIGS. 1–3, a rollback assembly 20 includes a chassis (or truck bed frame or bed frame) 22 which mounts to a deck support surface assembly 24 at a first pivot point 25. A cylinder or first motive element 81 is connected between a pair of points 26 and 27 for driving the deck support surface assembly 24 to pivot relative to the chassis 22 and move the deck from the transport position, illustrated in FIG. 1, to a tilted loading position (not shown). The deck support surface assembly 24 includes a subframe or bed carrier 28 pivotally connected at the pivot point 25 of the truck chassis 22, and a deck portion 30 which is slidable relative to the subframe 28.

Further, merely by way of example, a deck portion 30 is depicted that defines a surface 31 that supports a vehicle to be transported. A vertical forward end (not shown) of the deck portion 30 is defined at one longitudinal end of the rollback assembly 20. When it is desired to move the rollback assembly 20 to the loading position, the deck portion 30 is first driven rearwardly relative to the subframe 28 using a conventional means, typically hydraulic cylinders or screw actuators driven by a screw motor are utilized. The rearward movement of the deck portion 30 from the transport (rollback) position continues until the members arrive at an intermediate position. In the loading position a bottom face 35 contacts the ground.

Once in the loading position, a disabled vehicle 51 can be moved onto the surface 31, by winch or some other means, and the rollback assembly 20 may then move back to the transport (rollback) position. Initially, the subframe 28 is pivoted relative to the chassis 22 to return to the intermediate position. The deck portion 30 is then moved forward relative to the subframe 28 to return the deck to the transport (rollback) position, illustrated in FIG. 1. As the deck portion 30 initially begins to move forward from the intermediate position, this forward movement of the deck portion 30 relative to the subframe 28 or frame 22 continues until the deck portion 30 has returned to the transport (rollback) position illustrated in FIG. 1.

Figure 4:
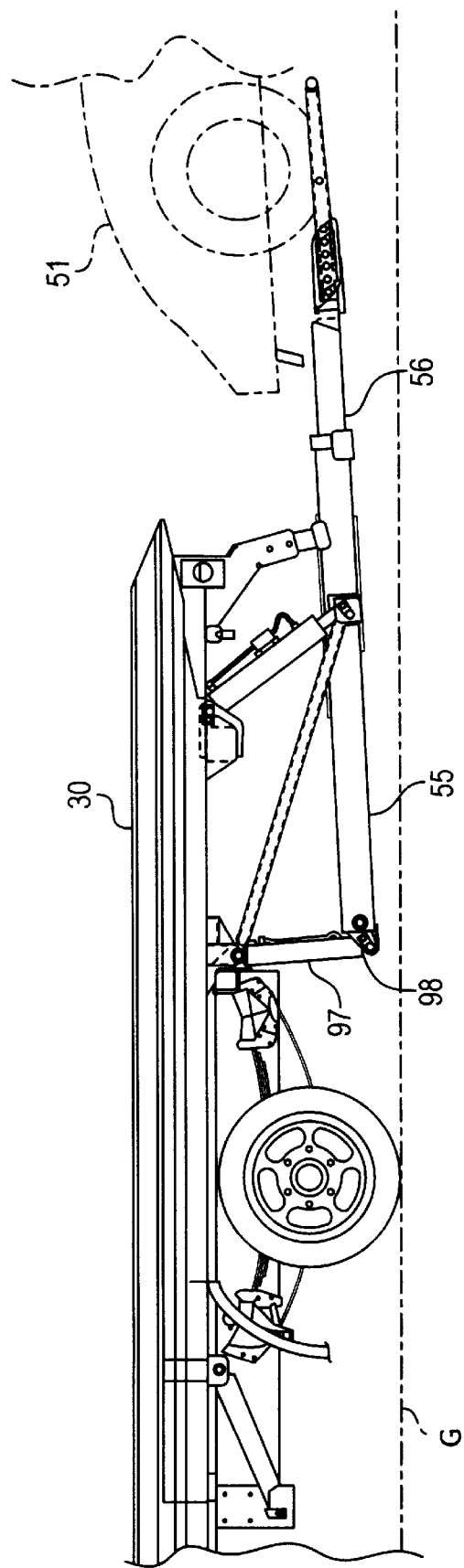
FIG. 4 is a side view of the wheel-lift apparatus attached below the rollback truck subframe, wherein the wheel-lift is in a carrying position such that it is aligned at an angle substantially above horizontal.
Figure 5:
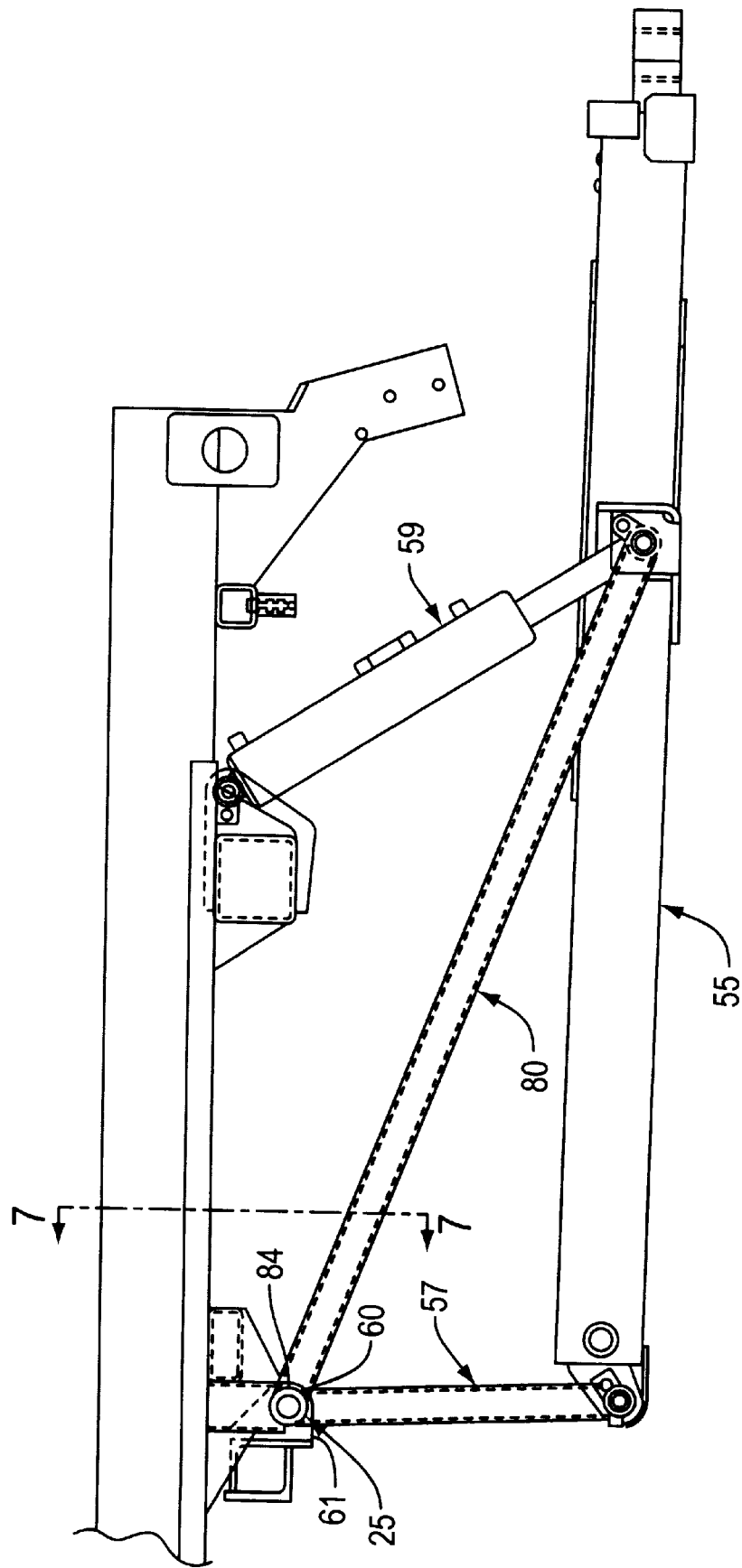
FIG. 5 illustrates a front plan view of an embodiment of the present invention.
Figure 6:
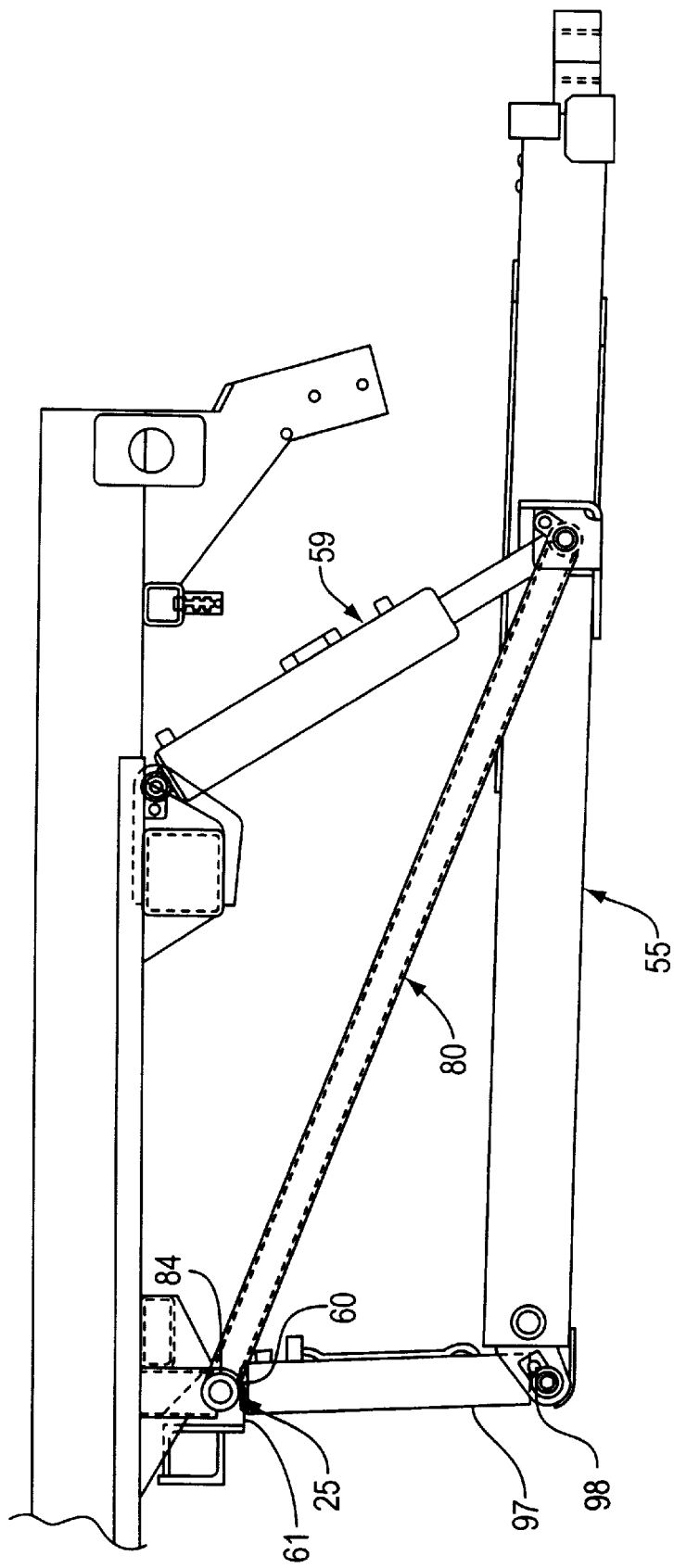
FIG. 6 illustrates a front plan view of an embodiment of the present invention having by-pass hydraulic valves on the second motive element.
Figure 7:
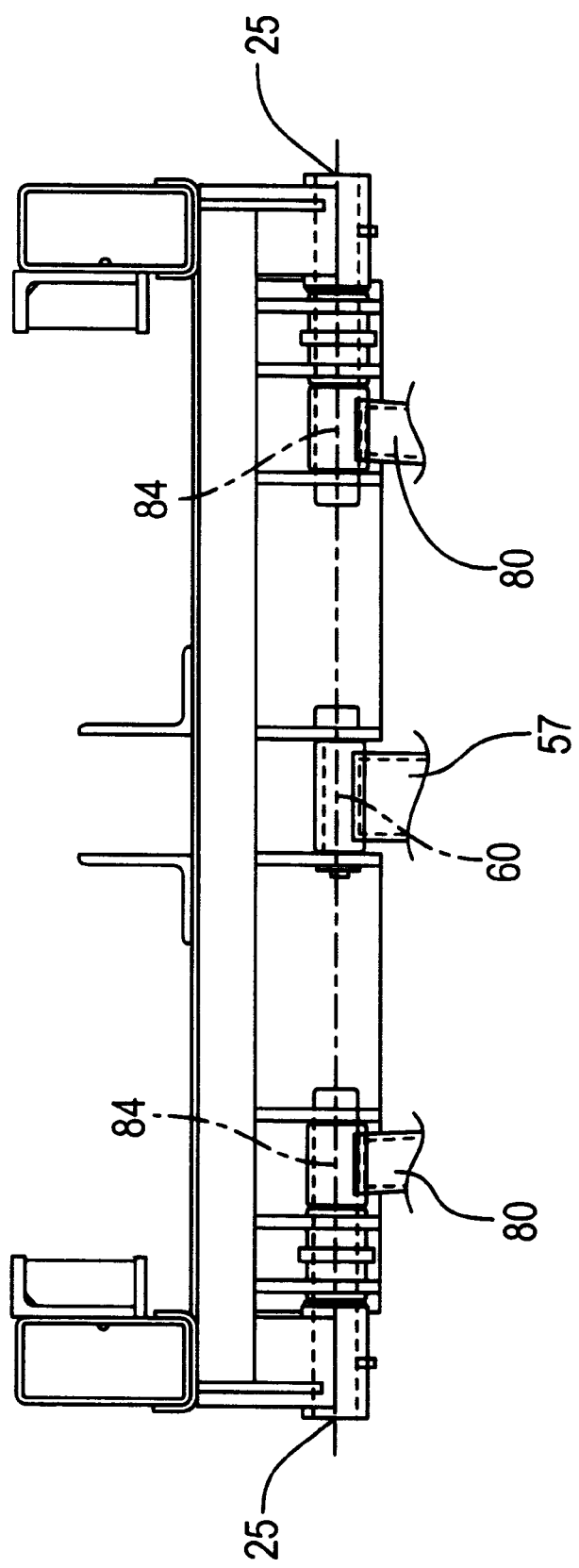
FIG. 7 illustrates a partial cross-sectional view of an embodiment of the present invention as seen along line 7—7 in FIG. 5.

Regardless of whether the rollback assembly 20 has loaded a disabled vehicle 51 onto the deck portion 30 to be transported, the wheel-lift apparatus 63 will accommodate a disabled vehicle to be loaded and carried. As depicted in FIG. 1, a wheel-lift apparatus 63 mounted below the subframe 28 to chassis 22 having an pivot arm 57 extending downward from the tilt housing 61 attached to the chassis 22 at a second pivot point 60. The wheel-lift apparatus 63 further includes a lift cylinder or second motive element 59 extending downward and pivotally attached to the subframe 28 whereby a base boom 55, which may be positioned to be horizontal to or in contact with the ground G, pivotally links the lower ends of the pivot arm 57 and lift cylinder 59. As depicted in FIGS. 4 and 6, a third motive element that includes a tilt cylinder 98 and tilt boom 97 alternatively replace the pivot arm 57 and be operated either in conjunction with or independently of the lift cylinder 59 for lowering and raising the base boom 55. A fly boom 56 is telescopically extendable from the outer end of the base boom 55 that may be positioned to be horizontal to or in contact with the ground G. The fly boom 56 has a "low profile" pivot 64 at its outer end so as to telescopically connect the wheel supporting cradle 70 for engaging the wheel W of the disabled vehicle which is to be loaded.

The horizontal boom approach upon the disabled vehicle presents a significant advantage over the prior art whereby risk to chassis or body is greatly diminished. This is because the horizontal, low angle, loading or carrying positions of the boom, having significant extension length capabilities, reduces the risk of the chassis or frame of the disabled vehicle from coming into contact with the fly or base booms 56 and 55 or wheel supporting cradle 70.

Referring to FIG. 1, the wheel-lift apparatus 63 is positioned to engage either the forward or rearward wheels W of the disabled vehicle. The tilt cylinder 98 (if used in place of the pivot arm 57) and the lift cylinder 59 are raised and lowered in conjunction with each other through some conventional means, typically an hydraulic actuator, a screw actuator driven by a screw motor, a pneumatic actuator, or various other mechanical devices (not shown), causing the base boom 55 to be raised or lowered in a horizontal position. The hydraulic circuit is controlled by at least one control lever (not shown) such that up to about forty percent of the hydraulic fluid is delivered to the tilt cylinder 98 and up to about sixty percent to the lift cylinder 59 thus causing the lift cylinder 59 and tilt cylinder 98 to rise or lower at different speeds relative to one another, thereby providing the horizontal approach. Distributing the power as mentioned above between the tilt cylinder 98 and the lift cylinder 59, rather than designating all the power to the lift cylinder 59 in absence of the existence of a tilt cylinder as in prior art apparatuses, allows the base boom 55 to operate at less of a slope and therefore more horizontal to the ground G. As a result, one of the advantages of the present invention is achieved by having the various booms and wheel supporting cradle 70 approach the disabled vehicles at a horizontal or "low angle" loading position.

The "low angle" approach allows the boom to remain horizontal to the slope of the ground surfaces where the recovery and disabled vehicles are located. The range of the "low angle" approach is between about −15 and 15 degrees. Indifferent to whether the particular ground surfaces are inclined, declined or level, the "low angle" approach enables the boom(s) to be horizontal with the slope of the ground surfaces. As a result, this enables the disabled vehicle to be lifted and carried with minimal risk of damage to the chassis or frame of the disabled vehicle.

The fly boom 56 is telescopically extendable, for example via hydraulic cylinders, from the base boom 55, while the wheel supporting boom 71 is also telescopically extendable, for example via hydraulic cylinders, at a low profile pivot 64 from the fly boom 56 and supports the wheel supporting cradle 70. The wheel supporting cradle 70 comprises the wheel supporting boom 71 extending rearwardly having a cross bar 72 and at each end of the cross bar 72, and generally perpendicular thereto, an arm 73 and 74 is connected by a conventional type housing 77 and 78. Attached to each arm 73 and 74 is a rear support 75 and 76 extending inwardly thereby forming an L-shaped support for each respective wheel W where the lower portion of the wheel W will be engaged for loading and carrying.

Various operating modes for the embodiments are possible. For example, as depicted in FIG. 3, base boom 55 can be raised or lowered in a substantially horizontal position with an angle below the horizontal so as to prepare for a low angle approach for a disabled vehicle located on a surface having a negative incline, i.e., a declining surface.

Finally, as additional examples, first shown in FIG. 1, the base boom 55 can be raised or lowered to precisely a horizontal position so as to tow the disabled vehicle in its carry position. After the wheels W of the disabled vehicle has been engaged by the wheel supporting cradle and the disabled vehicle is loaded and lifted then the vehicle is said to be in the carry position for transport. Next, as depicted in FIG. 4, the base boom 55 can be raised upwardly at a slope having an angle substantially above the horizontal for its carrying position.

An alternative embodiment of the present invention further includes a pair of stabilizer strut arms 80 having one of their ends fixably attached to the truck chassis 22 and the other end pivotably attached to the inner end of the base boom 55, the same point as where the lift cylinders 59 are also pivotably attached to the base boom 55. The third pivot point 84 of the stabilizer strut arms 80 may be mounted to the chassis 22 at a position concentrically or substantially concentrically aligned with the pivot point 25 of the subframe 28 and/or the pivot point 60 of the pivot arm 57. This feature will be more fully discussed below.

As will be readily seen by one skilled in the art, numerous conventional variations of linkages are contemplated by the present invention.

The embodiments described above provide a number of significant advantages. For example, the wheel-lift apparatus operates a boom in the horizontal or "low angle" loading position having a significant extension length whereby the risk of damage to the chassis or frame of the disabled vehicle due to contact between the boom or wheel supporting cradle and the frame/chassis is greatly diminished compared with the other inventions in this art.

The advantages of the present inventions are accomplished by the providing the additional cylinder(s), i.e., the tilt cylinder(s) 98, in the wheel-lift apparatus boom design. The benefit of the additional cylinder(s) provides the capability of the base boom 55 to have both its outer and inner ends to move either in relative uniformity with or independently from each other such that the base boom 55 remains horizontal to the ground G. In absence of the existence of the tilt cylinder, the inner end of the base boom 55 is fixed to move only pivotally while only allowing the outer end of the base boom 55 to move vertically via the lift cylinder 59. The end result is that the base boom operates having a greater slope. The present invention provides a tremendous advantage as a result of having various booms and a wheel-supporting cradle 70 capable of approaching the disabled vehicles at a horizontal, low angle, loading and carrying positions.

A unique feature of the present invention is that the first pivot point 25 and the second pivot point 60 are concentrically, or substantially concentrically, aligned with each other. Alternatively, the first pivot point 25 and the second pivot point 60 are aligned in a proximate or a proximate tangential relationship to each other to enable the bed carrier to tilt without causing wheel-lift misalignment in regard to the second motive element. In a further alternative embodiment the first pivot point 25 and the second pivot point 60 are aligned at least within a diameter of a largest of the first pivot and the second pivot to enable the bed carrier to tilt without causing wheel-lift misalignment in regard to the second motive element.

A further unique feature of the present invention is that the third pivot point 84 may also be concentrically, or substantially concentrically, aligned with the first pivot point 25 and the second pivot point 60. In a further alternative embodiment the third pivot point 84 is aligned in a proximate or a proximate tangential relationship to the first pivot point 25 and the second pivot point 60 or is aligned at least within a diameter of a largest of the first pivot and the second pivot to enable the bed carrier to tilt without causing wheel-lift misalignment in regard to the second motive element.

In the preferred embodiment of the present invention the first, second and third motive elements, 81, 59, and 97, respectively, are hydraulically actuated.

A further embodiment of the present invention includes a control element 100 on the second motive element 59 to maintain the wheel-lift in a predetermined position in the event of a failure of a second motive element 59. The control element 100 acts as a cut-off or kick-out by preventing the movement of the second motive element 59 upon failure of the second motive element 59. Preferably, the second motive element 59 is hydraulically actuated and the invention includes a hydraulic control element 100.

A final advantage of the present invention is that it readily lends itself to being used to retrofit old transport vehicles having rollback decks or other similar car carriers. The wheel-lift device can be mounted or welded to the chassis and the subframe of the transport vehicle.

It should be noted that the clearance between the base boom 55 and the ground G when the third motive element 98 is in the fully retracted position can be increased from that depicted in the accompanying figures by shortening the length of the third motive element 98 when it is in the fully retracted position.

Of course, it should be understood that a wide range of changes and modifications could be made to the preferred embodiment described above. It is therefore intended that the present invention is not limited to the embodiments described above, but encompasses any and all embodiments within the scope of the following claims, and equivalents thereof.

What is claimed is:

1. A combination tilting bed carrier and attached wheel-lift apparatus for mounting on a chassis of a towing vehicle comprising:
   a bed carrier for supporting a vehicle in tow;
   a first pivot positioned on said bed carrier for pivotally connecting said bed carrier to the chassis;
   a first motive element extending between the chassis and said bed carrier for actuating tilting of said bed carrier about said first pivot relative to the chassis;
   a wheel-lift positioned below said bed carrier and extending rearwardly thereof;
   a second pivot positioned on the chassis for pivotally connecting said wheel-lift to said chassis, said first pivot and said second pivot being concentrically aligned; and
   a second motive element extending between said wheel-lift and said bed carrier for actuating tilting of said wheel-lift about said second pivot relative to said bed carrier and the chassis.

2. The combination according to claim 1 wherein said wheel-lift is adapted to engage and lift the vehicle.

3. The combination according to claim 1 further comprising a third pivot positioned on said chassis for pivotally connecting a stabilizer strut arm between said wheel-lift and said bed carrier.

4. The combination according to claim 3 wherein said third pivot point is concentrically aligned with said first pivot and said second pivot.

5. The combination according to claim 3 wherein said third pivot is substantially concentrically aligned with said first pivot and said second pivot.

6. The combination according to claim 1 wherein said second motive element has a control element to maintain said wheel-lift in a predetermined position in the event of a failure of said second motive element.

7. The combination according to claim 1 wherein said first motive element and said second motive element are hydraulically actuated.

8. A combination tilting bed carrier and attached wheel-lift apparatus for mounting on a chassis of a towing vehicle comprising:
   a bed carrier for supporting a vehicle in tow;
   a first pivot positioned on said bed carrier for pivotally connecting said bed carrier to the chassis;
   a first motive element extending between the chassis and said bed carrier for actuating tilting of said bed carrier about said first pivot relative to the chassis;

a wheel-lift positioned below said bed carrier and extending rearwardly thereof;

a second pivot positioned on the chassis for pivotally connecting said wheel-lift to said chassis, said first pivot and said second pivot being substantially concentrically aligned; and a second motive element extending between said wheel-lift and said bed carrier for actuating tilting of said wheel-lift about said second pivot relative to said bed carrier and the chassis.

9. The combination according to claim 8 further comprising a third pivot positioned on said chassis for pivotally connecting a stabilizer strut arm between said wheel-lift and said bed carrier.

10. The combination according to claim 9 wherein said third pivot is substantially concentrically aligned with said first pivot and said second pivot.

11. The combination according to claim 8 wherein said second motive element has a control element to maintain said wheel-lift in a predetermined position in the event of a failure of said second motive element.

12. A combination tilting bed carrier and attached wheel-lift apparatus for mounting on a chassis of a towing vehicle comprising:

a bed carrier for supporting a vehicle in tow;

a first pivot positioned on said bed carrier for pivotally connecting said bed carrier to the chassis;

a first motive element extending between the chassis and said bed carrier for actuating tilting of said bed carrier about said first pivot relative to the chassis;

a wheel-lift positioned below said bed carrier and extending rearwardly thereof;

a second pivot positioned on the chassis for pivotally connecting said wheel-lift to said chassis, said first pivot and said second pivot being aligned in a proximate tangential relationship to each other to enable said bed carrier to tilt without causing wheel-lift misalignment in regard to said second motive element; and a second motive element extending between said wheel-lift and said bed carrier for actuating tilting of said wheel-lift about said second pivot relative to said bed carrier and the chassis.

13. The combination according to claim 12 further comprising a third pivot positioned on said chassis for pivotally connecting a stabilizer strut arm between said wheel-lift and said bed carrier.

14. The combination according to claim 12 wherein said second motive element has a control element to maintain said wheel-lift in a predetermined position in the event of a failure of said second motive element.

15. A combination tilting bed carrier and attached wheel-lift apparatus for mounting on a chassis of a towing vehicle comprising:

a bed carrier for supporting a vehicle in tow;

a first pivot positioned on said bed carrier for pivotally connecting said bed carrier to the chassis;

a first motive element extending between the chassis and said bed carrier for actuating tilting of said bed carrier about said first pivot relative to the chassis;

a wheel-lift positioned below said bed carrier and extending rearwardly thereof;

a second pivot positioned on the chassis for pivotally connecting said wheel-lift to said chassis, said first pivot and said second pivot being aligned at least within a diameter of a largest of said first pivot and said second pivot to enable said bed carrier to tilt without causing wheel-lift misalignment in regard to said second motive element; and a second motive element extending between said wheel-lift and said bed carrier for actuating tilting of said wheel-lift about said second pivot relative to said bed carrier and the chassis.

16. The combination according to claim 15 further comprising a third pivot positioned on said chassis for pivotally connecting a stabilizer strut arm between said wheel-lift and said bed carrier.

17. The combination according to claim 15 wherein said second motive element has a control element to maintain said wheel-lift in a predetermined position in the event of a failure of said second motive element.

* * * * *